US011920317B2

(12) United States Patent
Burke et al.

(10) Patent No.: US 11,920,317 B2
(45) Date of Patent: Mar. 5, 2024

(54) LID FOR UTILITIES ENCLOSURE HAVING INTERNAL REINFORCEMENT MATRIX AND METHOD FOR MAKING LID

(71) Applicant: CHANNELL COMMERCIAL CORPORATION, Temecula, CA (US)

(72) Inventors: Edward J. Burke, Temecula, CA (US); Thomas Edward Burke, Temecula, CA (US)

(73) Assignee: Channell Commercial Corporation, Temecula, CA (US)

( * ) Notice: Subject to any disclaimer, the term of this patent is extended or adjusted under 35 U.S.C. 154(b) by 154 days.

(21) Appl. No.: 17/401,084

(22) Filed: Aug. 12, 2021

(65) Prior Publication Data

US 2022/0049452 A1 Feb. 17, 2022

Related U.S. Application Data

(60) Provisional application No. 63/065,120, filed on Aug. 13, 2020.

(51) Int. Cl.

*B65D 90/10* (2006.01)
*B28B 1/14* (2006.01)
*B28B 23/02* (2006.01)
*E02D 29/14* (2006.01)
*E02D 29/05* (2006.01)
*E05B 65/00* (2006.01)
*E05C 1/08* (2006.01)

(52) U.S. Cl.

CPC ............ *E02D 29/1427* (2013.01); *B28B 1/14* (2013.01); *B28B 23/02* (2013.01); *B65D 90/105* (2013.01); *E02D 29/1472* (2013.01); *E02D 29/05* (2013.01); *E05B 65/0075* (2013.01); *E05C 1/08* (2013.01)

(58) Field of Classification Search

CPC . E02D 29/1427; E02D 29/1472; E02D 29/05; B28B 1/14; B28B 23/02; B28B 23/0068; B65D 90/105; E05B 65/0075; E05B 65/006; E05C 1/08

See application file for complete search history.

(56) References Cited

U.S. PATENT DOCUMENTS

| | | | | |
|---|---|---|---|---|
| 2006/0231279 A1* | 10/2006 | Burke | H02G 9/10 | 174/50 |
| 2012/0285105 A1* | 11/2012 | Burke | B65D 90/00 | 52/124.2 |
| 2014/0117018 A1* | 5/2014 | Burke | G02B 6/4451 | 220/484 |
| 2019/0176375 A1 | 6/2019 | Burke et al. | | |
| 2019/0301127 A1* | 10/2019 | Dang | E04C 5/20 | |
| 2021/0332616 A1 | 10/2021 | Burke | | |

* cited by examiner

*Primary Examiner* — Shawn M Braden

(74) *Attorney, Agent, or Firm* — Lewis Roca Rothgerber Christie LLP

(57) ABSTRACT

A lid for a utilities vault having a moldable core and a reinforcement matrix positioned within the core, the reinforcement matrix including longitudinally and laterally extending intersecting members and a plurality of lid feature housings positioned on and attached to the intersecting members, the lid feature housings extending through the core and protruding to the upper and lower surfaces of the lid, and the plurality of longitudinally and laterally extending intersecting members have a height sufficient to provide reinforcement without a perimeter member for the reinforcement matrix.

14 Claims, 7 Drawing Sheets

LID FOR UTILITIES ENCLOSURE HAVING INTERNAL REINFORCEMENT MATRIX AND METHOD FOR MAKING LID

CROSS-REFERENCE TO RELATED APPLICATION(S)

This application claims priority to and the benefit of U.S. Provisional Application No. 63/065,120, filed Aug. 13, 2020, the contents of which are incorporated herein by reference.

BACKGROUND OF THE INVENTION

Utilities of various types are commonly buried underground and include, for example, water, sewer, natural gas, telephone, cable television, telecommunications, irrigation, electric service, security and fiber optics. Such underground utilities commonly employ an access portal to allow service personnel to access the utilities for maintenance and meter readings. The access portal typically includes a buried vault where utility devices such as valve mains, meters and wired connectors are located. The vault includes an opening to which the utility devices are accessed. The vault opening is covered by a lid, such that the lid is located flush or nearly flush with the level of the surrounding ground. Lids typically are made of concrete, plastic or composite resins and polymers.

Concrete lids have been formed using a rubber mat and an aluminum dryer or a sheet metal form into which wet concrete is poured. In order to prevent breaking through use, prior concrete lids have been formed with one or more plastic sidewalls laterally surrounding the concrete core and a plastic reinforcement grid coupled to and surrounded by the plastic sidewalls. In these embodiments, the plastic sidewalls and the reinforcement grid are formed as a single integral unit by injection molded polypropylene. Problems associated with these prior lids include that they require an expensive separate injection molding process to conform the reinforcement grid with the plastic sidewalls. Further, depending upon the size of the lid, the plastic reinforcement grid connected to the sidewalls requires further support structures to be incorporated into the reinforcement grid so that portions of the reinforcement grid located away from the outer plastic sidewalls remain properly spaced within the lid during the manufacturing process as wet concrete has a tendency to move portions of the reinforcement grid when forming the lid. Further, concrete lids having a plastic sidewall around its perimeter have a tendency for the plastic sidewall to be cut during use creating sharp edges which could injure utilities personnel removing and replacing the lid from the vault, or interfere with the proper fitting of the lid on the vault. Consequently, a need exists for a concrete lid having an internal reinforcement matrix which eliminates the problems associated with existing concrete lids.

SUMMARY OF THE INVENTION

The present invention is directed to a lid incorporating a reinforcement matrix. In accordance with an embodiment, the lid includes a concrete core containing the reinforcement matrix therein which typically is made of plastic or other polymer such as polypropylene. The lid is rectangular in shape having rounded corners and has a top surface and a bottom surface, although other geometrical shapes including circular, square or other polygonal shapes are possible depending on the opening geometry for the vault to which the lid will be placed. Typically the top surface includes a textured finish to provide a non-skid surface.

The reinforcement matrix includes a plurality of lateral members and intersecting longitudinal members thereby forming a grid. The number of longitudinal and lateral members will depend upon the overall size of the lid. The length of each member is controlled by the length and width of the resulting lid so that it fits within the opening of the vault. The height of each member is sufficient so that they do not flex of bow during the molding process. The reinforcement matrix provides a map to which additional lid features can be attached such as a meter transmitter housing, a lid identification marker housing, a lid-lift pick hole housing, an L-bolt housing and bolt hole housings. These various housings can be attached to the reinforcement matrix when the reinforcement matrix is molded, or separately fashioned and attached during the manufacturing process of the lid. These housings provide for the proper spacing of the matrix within the concrete core.

Depending upon the overall size of the lid, if necessary additional strength members can be incorporated into the reinforcement matrix as needed. The lateral and longitudinal members can have channels positioned therein for receipt of longitudinal and lateral metal or plastic reinforcement rods for applications where additional reinforcement is required. For concrete lids, the manufacturing process would including placing the reinforcement matrix having the corresponding housings within a mold and pouring wet concrete over the matrix. The mold is positioned on a vibrating table to ensure the wet concrete fully fills the mold. When the concrete dries, the lid is then removed from the mold. The additional components are then added to the lid. On the lower surface of the lid the meter transmitter is positioned and an electronic marker is positioned to the identification marker housing. A lid retaining hook is fastened to the lower surface of the lid and on an opposite end a self-lock mechanism is positioned. The self-lock mechanism includes a cover.

DETAILED DESCRIPTION

Figure 1:
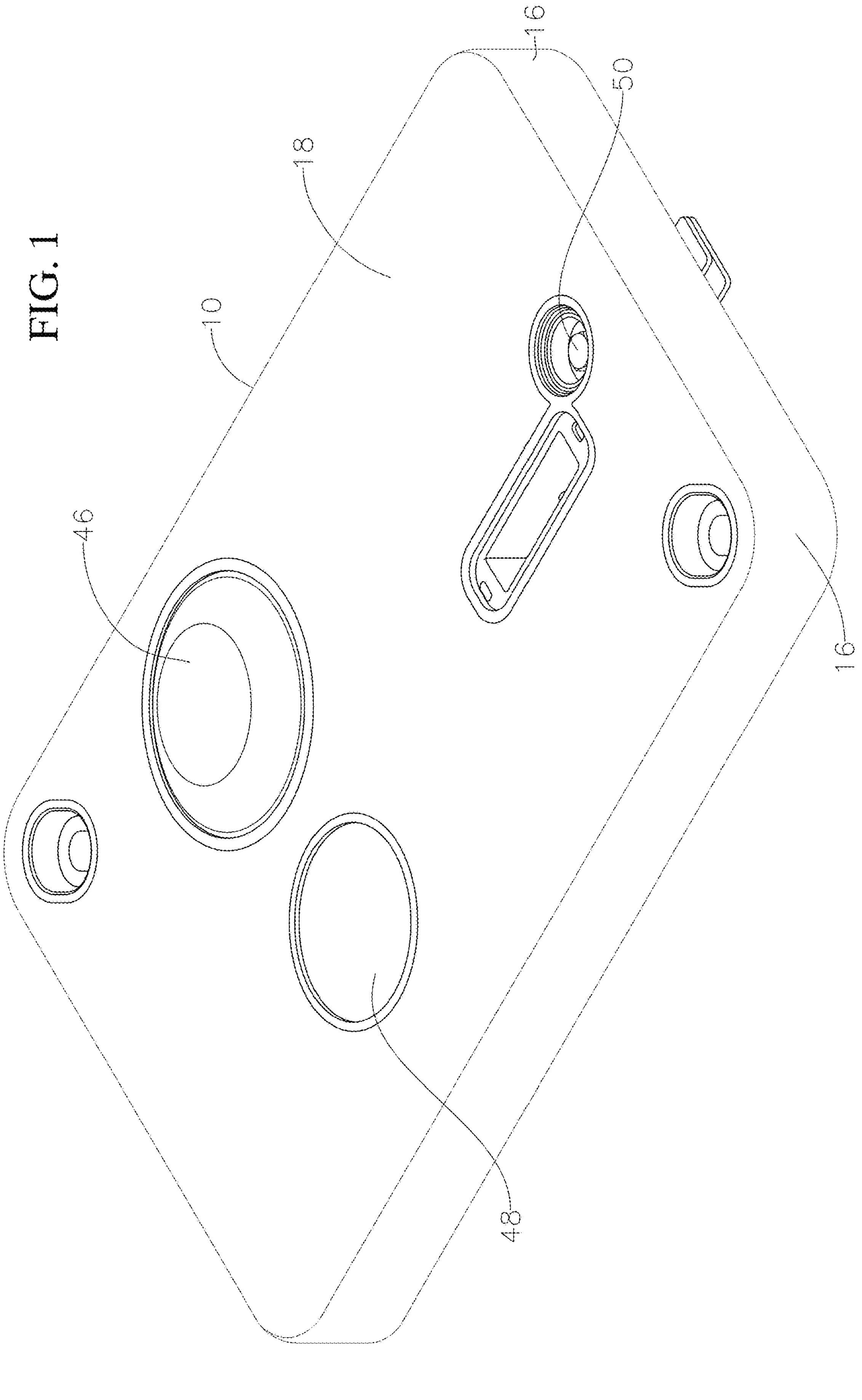
FIG. 1 is a perspective view of a concrete lid of the present invention.
Figure 2:
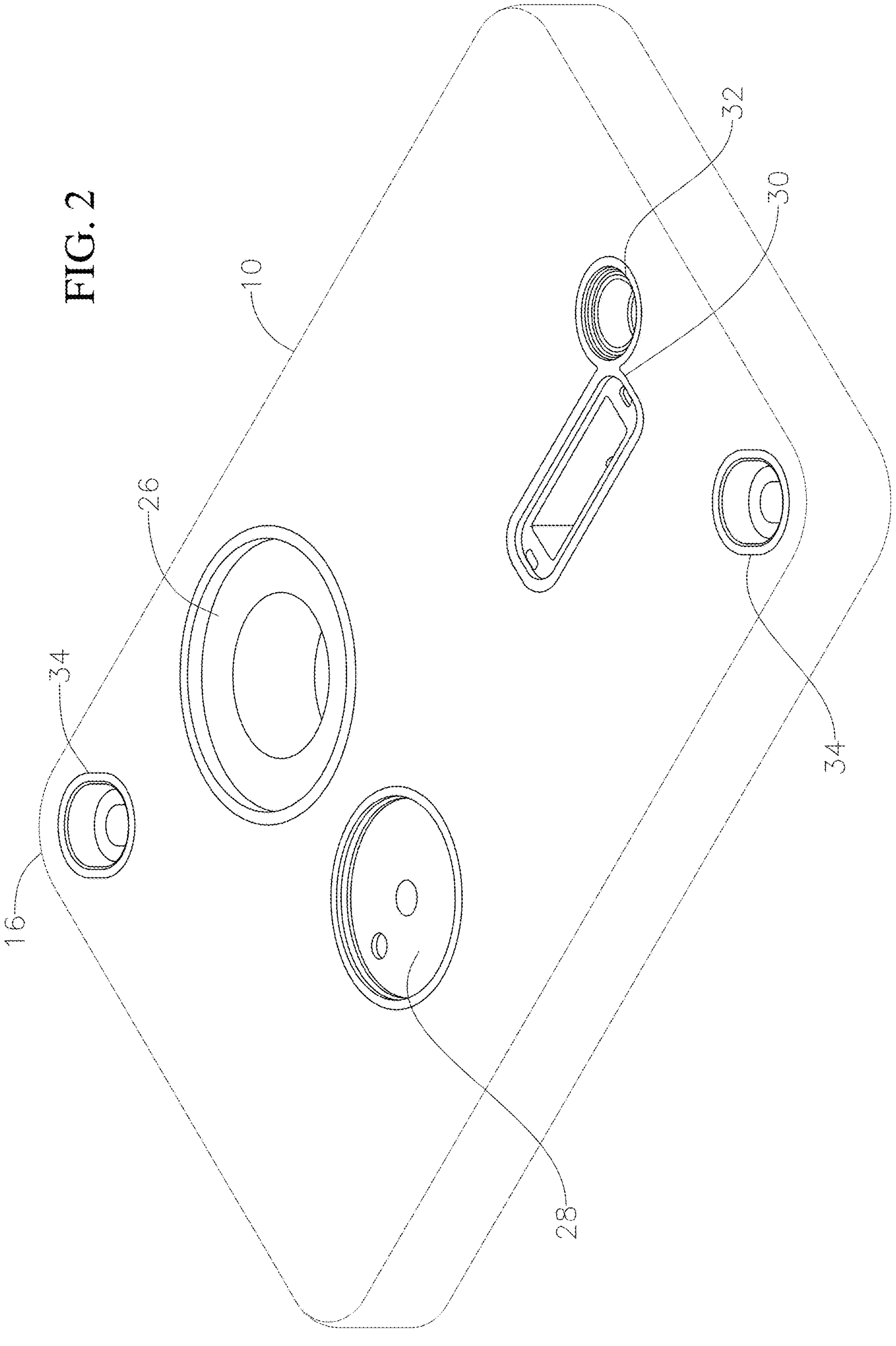
FIG. 2 is another perspective view of the lid of FIG. 1 with some components removed.
Figure 3:
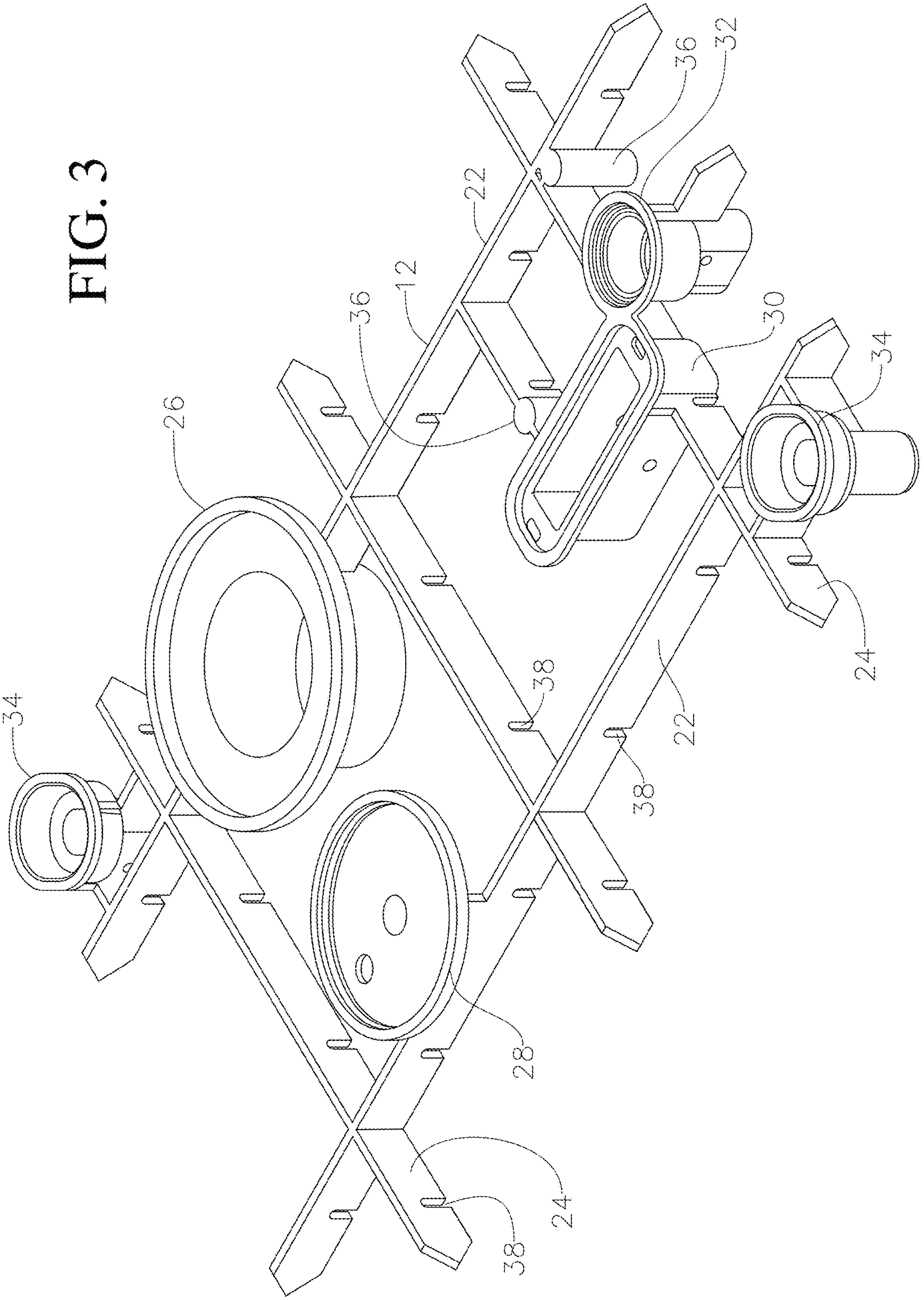
FIG. 3 is a perspective view of the reinforcement matrix of the lid.
Figure 4:
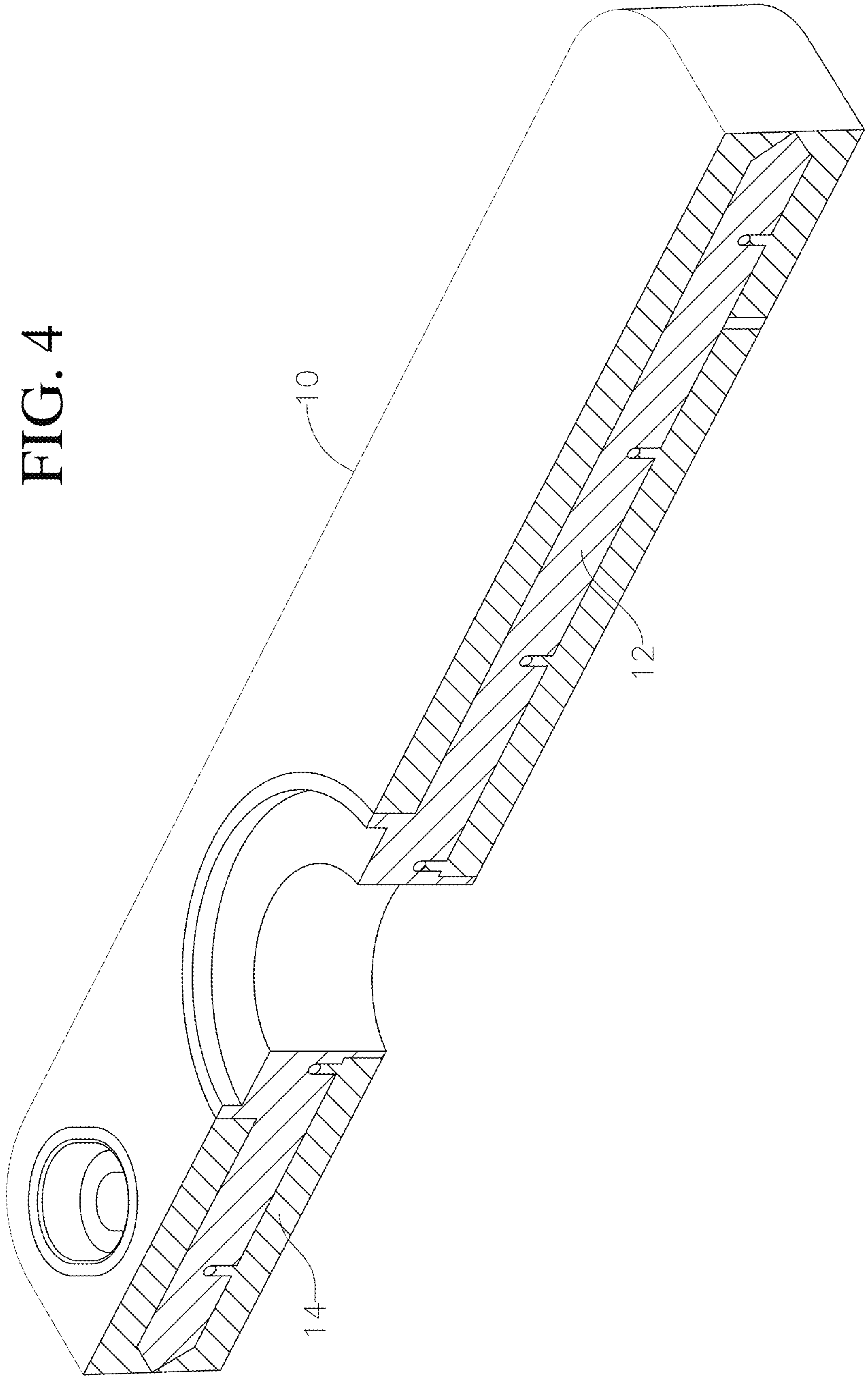
FIG. 4 is a cross-sectional view of the lid of FIG. 2.

FIGS. 1 and 2 illustrate an embodiment of a lid 10 of the present invention incorporating a reinforcement matrix 12 as shown in FIG. 3. FIG. 4 is a cross-sectional view of the lid 10 incorporating the reinforcement matrix 12. In accordance with this embodiment, lid 10 includes a concrete core 14 containing the reinforcement matrix therein which typically is made of plastic or other polymer such as polypropylene.

Figure 5:
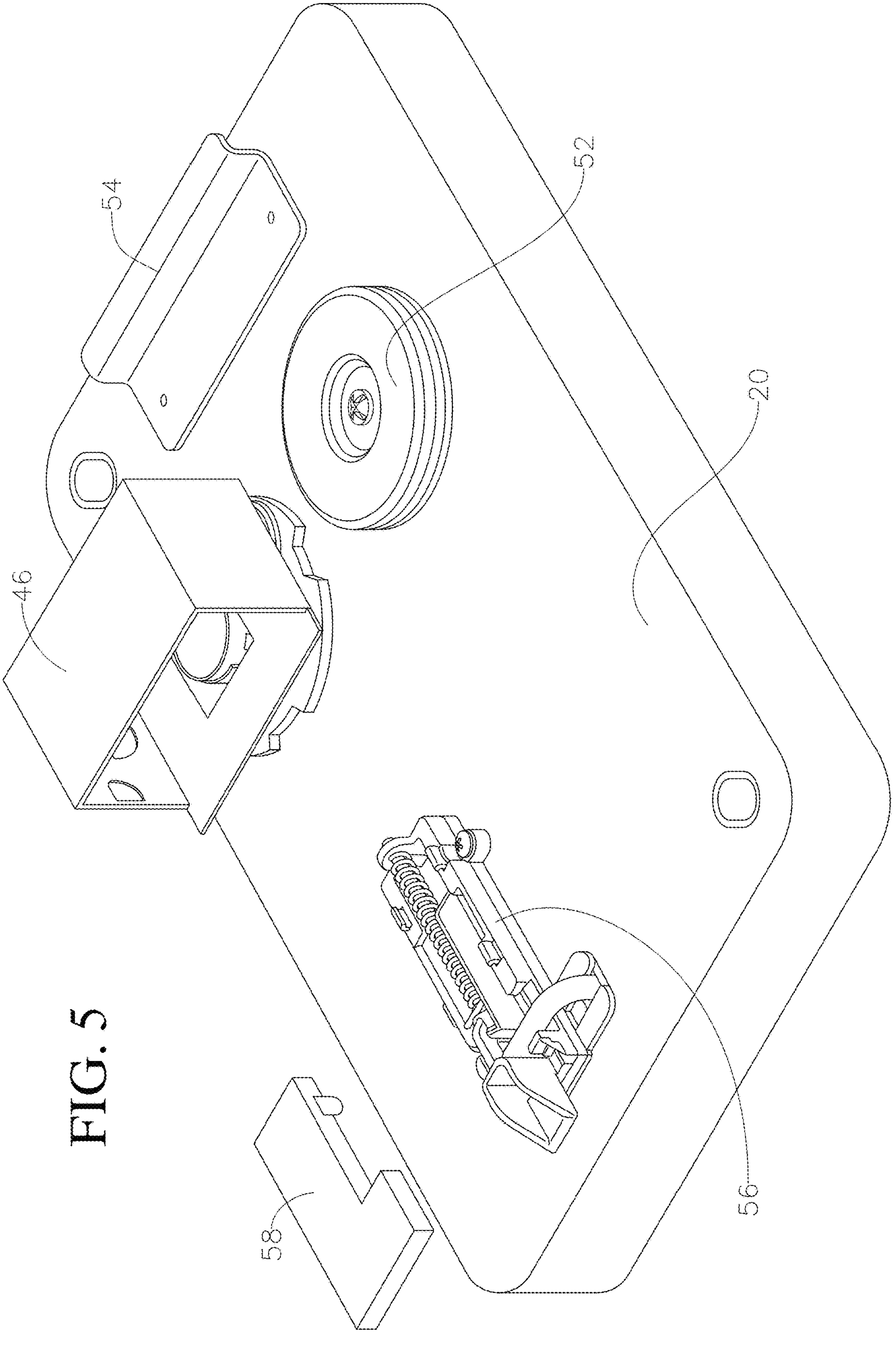
FIG. 5 is a perspective view of the lid of FIG. 1 viewed from the bottom of the lid.

The lid in this embodiment is rectangular in shape having rounded corners 16 and has a top surface 18 and a bottom surface 20 as shown in FIG. 5. Other geometrical shapes are also contemplated, including circular, square or other polygonal shapes to coincide with an opening in a vault in which the lid will be installed. Typically the top surface 18 would include a textured finish to provide a non-skid surface.

As shown in FIG. 3, the reinforcement matrix 12 includes a plurality of lateral members 22 and intersecting longitudinal members 24 thereby forming the grid. The number of longitudinal and lateral members will depend upon the overall size of the lid. The length of each member is controlled by the length and width of the resulting lid 10 so that it fits within the opening of the vault. The height of each member is sufficient so that they do not flex or bow during the molding process and provide the necessary reinforcement for the lid without the need for an outer perimeter member connecting the individual reinforcement members of the matrix. The reinforcement matrix 12 also provides a map to which additional lid features can be attached such as a meter transmitter housing 26, a lid identification marker 28, a lid-lift pick hole housing 30, an L-bolt housing 32 and bolt hole housings 34. These various housings can be attached to the reinforcement matrix when the reinforcement matrix is molded, or separately fashioned and attached during the manufacturing process of the lid. These housings 26-34 provide for the proper spacing of the matrix within the concrete core as illustrated in FIG. 4.

Figure 6:
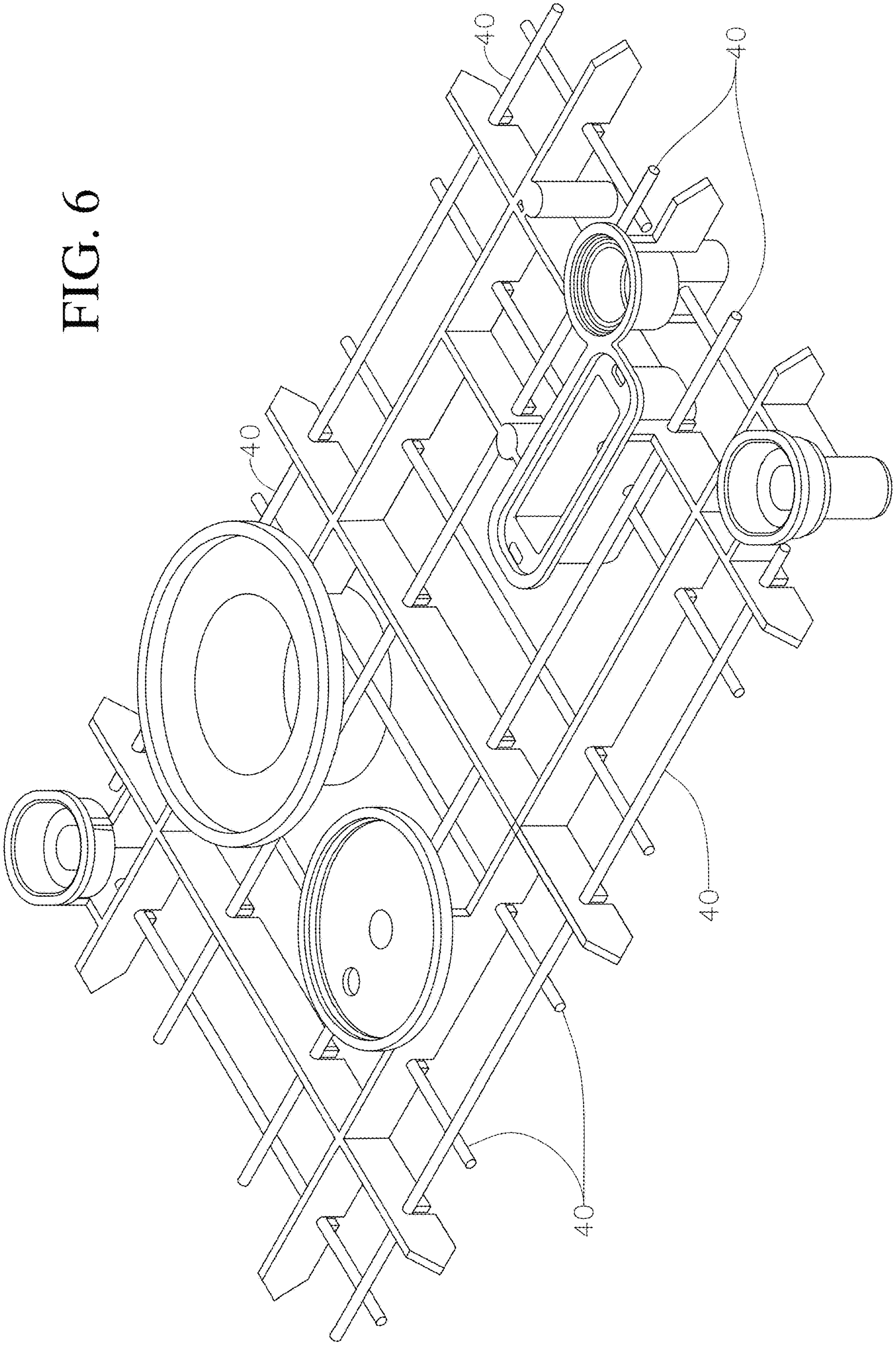
FIG. 6 is a perspective view of an alternative reinforcement matrix of the lid.
Figure 7:
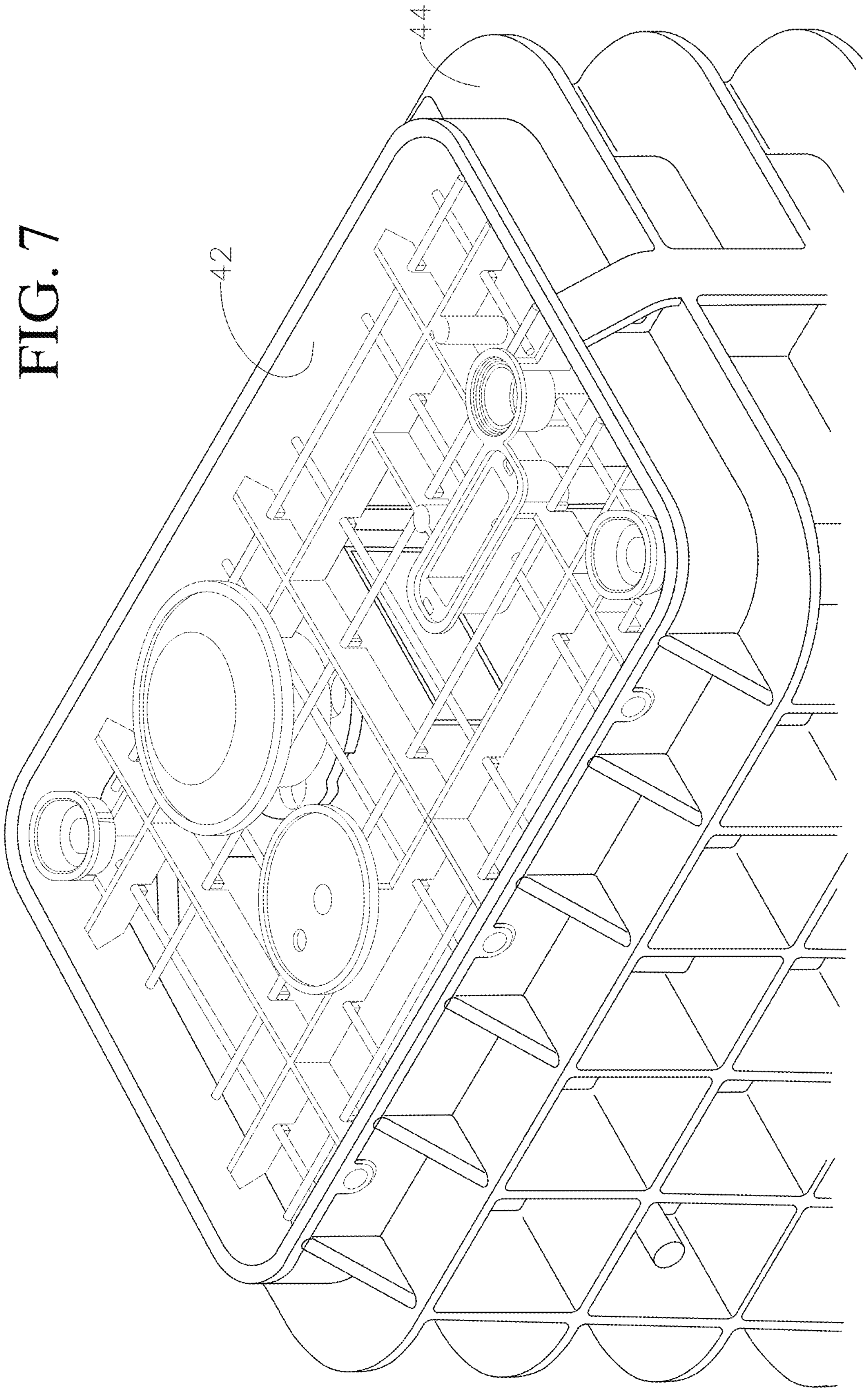
FIG. 7 is a perspective view of the matrix of FIG. 6 positioned on the opening of a utility vault.

Depending upon the overall size of the lid, if necessary additional strength members 36 can be incorporated into the reinforcement matrix as needed. The lateral and longitudinal members 22 and 34 can have channels 38 positioned therein for receipt of the strength members which can be longitudinal and lateral metal or plastic reinforcement rods 40 as shown in FIG. 6. Reinforcement rods 40 are for applications where additional reinforcement is required. As shown in FIG. 7, the reinforcement matrix and corresponding housings are positioned within and sized to fill an opening 42 in a utility vault 44.

For concrete lids, the manufacturing process would including placing the reinforcement matrix having the corresponding housings within a mold and pouring wet concrete over the matrix. The mold is positioned on a vibrating table to ensure the wet concrete fully fills the mold. When the concrete dries, the lid is then removed from the mold. Additional components are then added to the lid including the meter transmitter 46 within the meter transmitter housing, an identification placard 48 positioned within the identification placard housing and an L-bolt 50 is positioned within the L-bolt housing as shown in FIG. 1. On the lower surface of the lid as shown in FIG. 5, the meter transmitter 46 is positioned and an electronic marker is positioned to the identification marker housing 28. A lid retaining hook 54 is fastened to the lower surface of the lid and a self-lock mechanism 56 is positioned on an opposite end of the bottom surface of the lid. The self-lock mechanism includes a cover 58 which functions as discussed in detail in Applicant's U.S. patent application Ser. No. 16/855,820, the contents of which are incorporated herein by reference.

Although the present invention has been discussed with respect to a concrete lid, it is to be understood that the inventive concepts are also applicable to other materials, such as thermoset polymer as disclosed in detail in Applicant's U.S. application Ser. No. 16/276,305, the contents of which are incorporated herein by reference. A thermoset polymer or other sheet material compound is typically molded in a sheet molding process wherein the reinforcement matrix would be incorporated into the mold during the molding process. Other types of polymers, plastics or other materials are also contemplated.

What is claimed is:

1. A lid for a utilities vault comprising:

a moldable core; and a reinforcement matrix positioned within the core;

wherein the reinforcement matrix includes a plurality of longitudinally and laterally extending intersecting members and a plurality of lid feature housings positioned on and attached to the intersecting members, the lid feature housings extending through the core and protruding to the upper and lower surfaces of the lid;

wherein the plurality of longitudinally and laterally extending intersecting members have a height sufficient to provide reinforcement without a perimeter member for the reinforcement matrix;

wherein the reinforcement matrix further includes a plurality of reinforcement members extending through the matrix;

wherein the reinforcement members are rods extending through the reinforcement matrix; and wherein the rods extend through channels positioned in the plurality of longitudinally and laterally extending intersecting members of the reinforcement matrix.

2. The lid of claim 1, wherein the lid further has a shielded self-locking mechanism on a lower surface of the lid.

3. The lid of claim 1, wherein the lid feature housings include at least one of a meter transmitter housing, a lid identification marker housing, a lid-lift pick hole housing, an L-bolt housing and bolt hole housings.

4. The lid of claim 1, wherein the moldable core is concrete or sheet molding compound.

5. A method of molding a lid comprising:

forming a reinforcement matrix having a plurality of intersecting members;

positioning and attaching lid feature housings to the reinforcement matrix;

placing the reinforcement matrix and lid feature housings in a mold; and casting a core material into the mold;

wherein the reinforcement matrix further includes a plurality of reinforcement members extending through the matrix;

wherein the reinforcement members are rods extending through the reinforcement matrix; and wherein the rods extend through channels positioned in the plurality of intersecting members of the reinforcement matrix.

6. The method of claim 5, wherein the step of casting core materials into the mold includes placing wet concrete into the mold and curing the wet concrete.

7. The method of claim 5, wherein the method step of casting a core includes molding a sheet molding compound containing the reinforcement matrix.

8. The method of claim 5, further comprising the step of attaching a shielded self-locking mechanism on a lower surface of the lid.

9. The method of claim 5, wherein forming the reinforcement matrix further includes placing the plurality of reinforcement members through the reinforcement matrix.

10. The method of claim 9, wherein placing the plurality of reinforcement members through the reinforcement matrix includes forming channels in the reinforcement matrix for receipt of the reinforcement members.

11. The method of claim 5, wherein the lid feature housings include at least one of a meter transmitter housing, a lid identification marker housing, a lid-lift pick hole housing, an L-bolt housing and bolt hole housings.

12. A lid for a utilities vault comprising:

a molded concrete core; and a plastic reinforcement grid positioned within the core;

wherein the reinforcement grid includes a plurality of longitudinally and laterally extending intersecting members and a plurality of lid feature housings positioned on and attached to the intersecting members, the lid feature housings extending through the core and protruding to the upper and lower surfaces of the lid;

wherein the plurality of longitudinally and laterally extending intersecting members have a height sufficient to provide reinforcement for the lid without being connected at an end of each intersecting member of the reinforcement grid;

wherein the reinforcement matrix further includes a plurality of reinforcement members extending through the matrix;

wherein the reinforcement members are rods extending through the reinforcement matrix; and wherein the rods extend through channels positioned in the plurality of longitudinally and laterally extending intersecting members of the reinforcement matrix.

13. The lid of claim 12, wherein the lid further has a shielded self-locking mechanism on a lower surface of the lid.

14. The lid of claim 12, wherein the lid feature housings include at least one of a meter transmitter housing, a lid identification marker housing, a lid-lift pick hole housing, an L-bolt housing and bolt hole housings.

* * * * *